US011359605B2

(12) United States Patent
Wu et al.

(10) Patent No.: US 11,359,605 B2
(45) Date of Patent: Jun. 14, 2022

(54) GENERATOR MODULE AND WIND TURBINE HAVING THE SAME

(71) Applicant: XINJIANG GOLDWIND SCIENCE & TECHNOLOGY CO., LTD., Xinjiang (CN)

(72) Inventors: Qinghu Wu, Beijing (CN); Zhanhai Wu, Beijing (CN); Yaosong Liu, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 500 days.

(21) Appl. No.: 16/472,412

(22) PCT Filed: Aug. 1, 2018

(86) PCT No.: PCT/CN2018/098002
§ 371 (c)(1),
(2) Date: Jun. 21, 2019

(87) PCT Pub. No.: WO2019/174177
PCT Pub. Date: Sep. 19, 2019

(65) Prior Publication Data
US 2021/0363970 A1 Nov. 25, 2021

(30) Foreign Application Priority Data
Mar. 15, 2018 (CN) .......................... 201810213118.0

(51) Int. Cl.
*F03D 9/00* (2016.01)
*H02P 9/04* (2006.01)
(Continued)

(52) U.S. Cl.
CPC ............... *F03D 9/25* (2016.05); *F03D 15/00* (2016.05); *F03D 80/82* (2016.05);
(Continued)

(58) Field of Classification Search
CPC . F03D 9/25; F03D 15/00; F03D 80/82; F05B 2220/706; F05B 2260/4021
See application file for complete search history.

(56) References Cited

U.S. PATENT DOCUMENTS 1,978,143 A    10/1934  Reimers
2,224,052 A *  12/1940  Irwin ..................... F03D 80/70
                                                          290/55
(Continued)

FOREIGN PATENT DOCUMENTS

CN    102308088 A    1/2012
CN    202611998 U    12/2012
(Continued)

OTHER PUBLICATIONS

International Search Report and Written Opinion dated Nov. 21, 2019; PCT/CN2018/098002.
(Continued)

*Primary Examiner* — Tulsidas G Patel
*Assistant Examiner* — Thomas K Quigley (57) ABSTRACT

A generator module and a wind turbine having the same are provided according to the present application. The generator module includes a generator module housing, a generator unit and a generator rotating shaft. The generator unit is arranged in the generator module housing and includes a rotor and a stator. One end of the generator rotating shaft is connected to the rotor, and the generator rotating shaft is provided with a belt pulley. The generator module according to the present application may be flexibly arranged above a nacelle or inside the nacelle according to requirements, and may be separately replaced and maintained as an independent subsystem, which reduces the maintenance cost.

12 Claims, 6 Drawing Sheets

(51) Int. Cl.
*F03D 9/25* (2016.01)
*F03D 80/80* (2016.01)
*F03D 15/00* (2016.01)

(52) U.S. Cl.
CPC ... *F05B 2220/706* (2013.01); *F05B 2260/403* (2013.01); *F05B 2260/4021* (2013.01)

(56) References Cited

U.S. PATENT DOCUMENTS

| | | | | |
|---|---|---|---|---|
| 4,218,175 | A * | 8/1980 | Carpenter | F03D 1/04 |
| | | | | 415/219.1 |
| 4,585,950 | A | 4/1986 | Lund | |
| 4,757,211 | A | 7/1988 | Kristensen | |
| 6,856,042 | B1 * | 2/2005 | Kubota | F03D 1/025 |
| | | | | 290/55 |
| 8,258,505 | B2 * | 9/2012 | Kume | H01L 51/5036 |
| | | | | 257/40 |
| 8,482,147 | B2 * | 7/2013 | Moser | F03D 15/00 |
| | | | | 290/55 |
| 8,851,839 | B2 | 10/2014 | Eckart | |
| 9,441,712 | B1 * | 9/2016 | Tjensvoll | F16H 7/02 |
| 11,009,010 | B1 * | 5/2021 | Saavedra | F03D 7/0204 |
| 2010/0019501 | A1 | 1/2010 | Sun | |
| 2010/0276942 | A1 * | 11/2010 | Hicks | F16H 3/724 |
| | | | | 290/1 C |
| 2011/0018269 | A1 | 1/2011 | Moser et al. | |
| 2011/0221191 | A1 * | 9/2011 | Fiset | H02K 19/36 |
| | | | | 290/5 |
| 2011/0281677 | A1 | 11/2011 | Tjensvoll | |
| 2014/0054897 | A1 * | 2/2014 | Casazza | H02K 1/32 |
| | | | | 290/55 |
| 2016/0017867 | A1 | 1/2016 | Tjensvoll | |
| 2016/0258418 | A1 | 9/2016 | Kudsk et al. | |

FOREIGN PATENT DOCUMENTS

| | | |
|---|---|---|
| CN | 105275747 A | 1/2016 |
| CN | 105765218 A | 7/2016 |
| CN | 106593775 A | 4/2017 |
| DE | 4301342 C1 | 4/1994 |
| DE | 102016206708 A1 | 10/2017 |
| DE | 102016206888 A1 | 10/2017 |
| KR | 20100080009 A | 7/2010 |
| WO | 2017212086 A1 | 12/2017 |

OTHER PUBLICATIONS

Australian Examination Report No. 3 dated Sep. 30, 2020; Appln. No. 2018374074.
The Extended European Search Report dated Apr. 30, 2021; Appln. No. 18887200.6.
Australian Examination Report No. 2 dated Jun. 26, 2020; Application No. 2018374074.

* cited by examiner

GENERATOR MODULE AND WIND TURBINE HAVING THE SAME

CROSS REFERENCE TO RELATED APPLICATIONS

This application is the national phase of International Application No. PCT/CN2018/098002, titled "GENERATOR MODULE AND WIND TURBINE HAVING THE SAME", filed on Aug. 1, 2018, which claims the benefit of priority to Chinese Patent Application No. 201810213118.0, titled "MODULAR GENERATOR AND WIND TURBINE HAVING THE SAME", filed with the State Intellectual Property Office of People's Republic of China on Mar. 15, 2018, the entire disclosures of which applications are incorporated herein by reference.

FIELD

The present application relates to a generator module and a wind turbine having the same. In addition to the field of wind power generation, the generator module may also be applied to other fields.

BACKGROUND

A wind turbine is a power machine that converts wind energy into mechanical energy. At present, the mainstream wind turbine is mainly divided into two categories, that is, a direct-drive wind turbine without a speed-increasing transmission system and a doubly-fed wind turbine with a speed-increasing transmission system.

Figure 1:
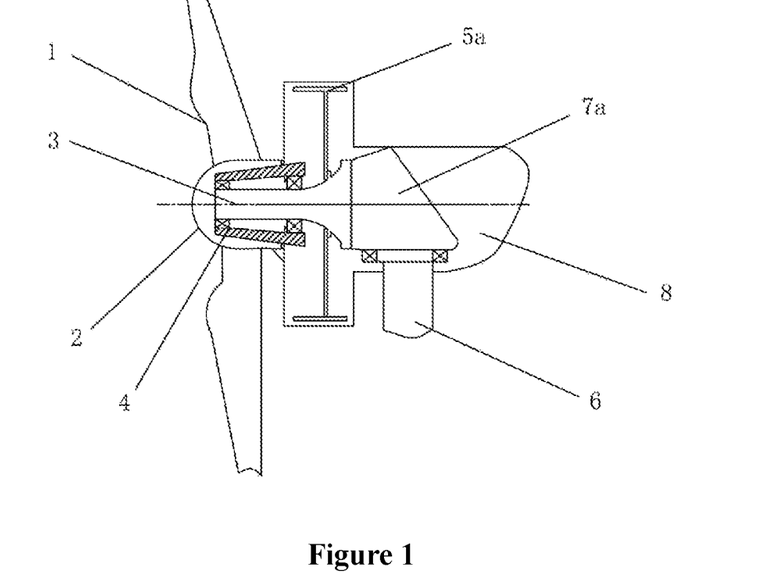
FIG. 1 is a schematic view showing the structure of a conventional direct-drive wind turbine.

However, both the two different types of wind turbines have drawbacks. For the direct-drive wind turbine, as shown in FIG. 1, since heavier components such as a blade 1, a hub 2 and a generator 5a and the like are located in front of a tower 6, the center of gravity of a head of the direct-drive wind turbine is in front of the tower 6, and a large bending moment is formed on the tower 6 under the action of the gravity, and therefore, the strength of the tower 6 is required to be enhanced to ensure overall force balance, which will increase the cost of the product undoubtedly. Moreover, since there is no speed-increasing system, the generator of the direct-drive wind turbine is large, and the blade 1, the hub 2, the rotating shaft 4 and the rotor of the generator are connected as an integral body and rotated together, which affects a gap between the rotor the stator of the generator. In FIG. 1, the numeral 3 indicates a main shaft, the numeral 7a indicates a nacelle base, and the numeral 8 indicates a nacelle.

Figure 2:
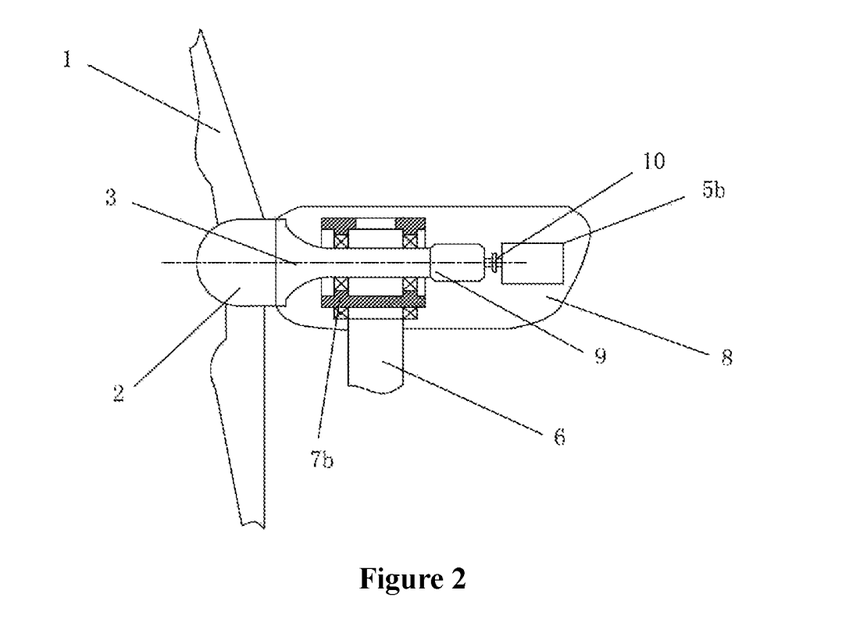
FIG. 2 is a schematic view showing the structure of a conventional doubly-fed wind turbine.

For the doubly-fed wind turbine, as shown in FIG. 2, the main shaft 3 extending into the nacelle is supported by a bearing arranged at a nacelle base 7b, the wind acting on the blade 1 drives the hub 2 and the main shaft 3 to rotate, and the rotational torque is transferred to a generator 5b via a gear box 9 and a coupling 10. Because the transmission chain of the doubly-fed wind turbine is longer than that of the direct-drive wind turbine, and the designed life of the wind turbine is 20 years, the double-fed wind turbine is apt to cause more malfunctions during long-term high-speed operation. For example, after the gear box of the doubly-fed wind turbine has operated for a certain period of time, oil leakage of the gear box is likely to occur due to the wear of the gasket, which pollutes the interior of the wind turbine and the environment as well. Moreover, because the doubly-fed wind turbine has more high-speed transmission members and contains more lubricant, more regular fat liquoring and lubricating are required, which increases the maintenance cost.

SUMMARY

In view of the deficiencies of the conventional technology, an object of the present application is to provide a modular generator, so that the generator may be flexibly arranged according to requirements and has better maintenance characteristics.

Another object of the present application is to provide a new wind turbine, to solve the defects of the conventional technology that the center of gravity of the direct-drive wind turbine is in front of the tower and the maintenance of the doubly-fed wind turbine is cumbersome.

According to an aspect of the present application, a generator module is provided. The generator module includes a generator module housing, a generator unit and a generator rotating shaft. The generator unit is arranged in the generator module housing, and the generator unit includes a rotor and a stator. One end of the generator rotating shaft is connected to the rotor, where the generator rotating shaft is provided with a belt pulley.

According to another aspect of the present application, a wind turbine is provided. The wind turbine includes a tower; a nacelle arranged at a top of the tower; a hub, on which a blade is mounted; and a main shaft, where one end of the main shaft is connected to the hub, and another end of the main shaft extends to an inside of the nacelle. The wind turbine includes the above generator module, which is mounted inside or outside the nacelle. The main shaft is provided with a driving belt pulley, the driving belt pulley is connected to the belt pulley directly via a transmission belt, to drive the generator rotating shaft to rotate.

A technical solution of a generator module is provided according to the present application, the generator can be arranged above the nacelle or inside the nacelle according to requirements, and the arrangement is flexible. Thereby, an optimal arrangement is easy to achieve, which has high economy. The generator module may be separately replaced and maintained as an independent subsystem, which reduces the maintenance cost. Therefore, compared with the conventional direct-drive generator and the doubly-fed generator, the generator module has better maintenance characteristics and is easier to hoist.

According to the wind turbine of the present application, the generator module is directly driven by the main shaft through the transmission belt, and the generator module may be flexibly arranged and separately mounted, replaced and maintained, thereby reducing the mounting and maintenance cost of the wind turbine. Compared with the direct-drive wind turbine, since the generator module may be flexibly arranged, the position of the center of gravity may be adjusted, a transmission ratio may be increased to a certain extent via the transmission belt, which may decrease the size and weight of the generator, and thereby reducing the cost. Compared with the doubly-fed wind turbine, with the belt transmission, the wind turbine is easier to maintain, no oil filling is required, no oil leakage may occur, and thus the environment is not polluted. Moreover, with the belt-and-pulley type transmission, the generator may be required to withstand the torque only, which has good mechanical properties, ensures the gap between the stator and the rotor

REFERENCE NUMERALS

| | |
|---|---|
| 1 blade, | 2 hub, |
| 3 main shaft, | 33 driving belt pulley, |
| 4 rotating shaft, | 5a, 5b generator, |
| 6 tower, | 7a, 7b, 7c nacelle base, |
| 8 nacelle, | 81 nacelle top mounting platform, |
| 82 mounting block, | 9 gear box, |
| 10 coupling, | 11 generator module, |
| 110 generator module housing, | 111 generator unit, |
| 112 generator rotating shaft, | 113 belt pulley, |
| 13 transmission belt, | |
| 14 transmission belt tensioning mechanism, | |
| 141 roller, | 142 bearing support seat, |
| 143 bracket, | 144 adjusting bolt, |
| 145 elastic member, | 151 hydraulic cylinder, |
| 152 hydraulic gauge. | |

DETAILED DESCRIPTION

A wind turbine according to an exemplary embodiment of the present application is described hereinafter in conjunction with drawings.

Figure 3:
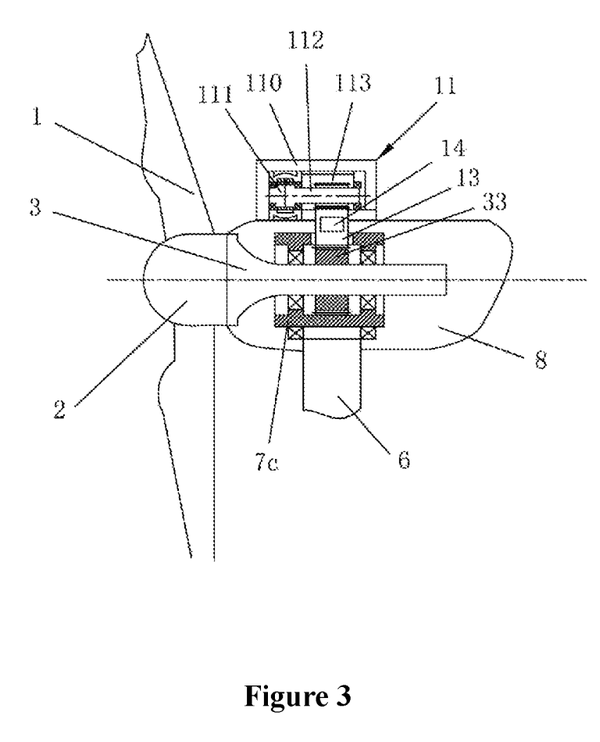
FIG. 3 is a schematic view showing the structure of a wind turbine according to an embodiment of the present application.

As shown in FIG. 3, the wind turbine according to the exemplary embodiment of the present application includes a tower 6, and a nacelle 8, a blade 1, a hub 2 and a main shaft 3 arranged at a top of the tower 6. The blade 1 is mounted on the hub 2. One end of the main shaft 3 is connected to the hub 2, and another end of the main shaft 3 extends to an inside of the nacelle 8. When the wind acts on the blade 1, the hub 2 drives the main shaft 3 to rotate. The blade 1 may be connected to the hub 2 via a pitch varying bearing, so as to realize pitch variation. The main shaft 3 is connected to a nacelle base 7c through a main bearing, and the nacelle base 7c is connected to the tower 6 through a yaw bearing, so as to realize yaw.

The wind turbine according to the exemplary embodiment of the present application includes a generator module 11, and the generator module 11 is mounted inside or outside the nacelle 8 (FIG. 3 shows a situation that the generator module 11 is mounted outside the nacelle 8). The generator module 11 includes a generator module housing 110 and a generator unit 111 arranged in the generator module housing 110. The generator unit 111 includes a rotor and a stator, one end of a generator rotating shaft 112 is connected to the rotor, and the generator rotating shaft 112 is provided with a belt pulley 113. The stator is fixed in the generator module housing 110, and the rotor is rotatably fitted with the stator.

The main shaft 3 is provided with a driving belt pulley 33, and the driving belt pulley 33 is directly connected to the belt pulley 113 via a transmission belt 13, to drive the generator rotating shaft 112 to rotate. Thus, a rotational torque of the main shaft 3 is transmitted to the generator rotating shaft 112 through the transmission belt 13, to drive the generator rotating shaft 112 to rotate, thereby realizing power generation.

The generator module 11 is integrally designed, which can be separately hoisted, mounted, replaced and maintained, thereby reducing installation and maintenance costs of the wind turbine.

The generator unit 111 may be of an outer-rotor and inner-stator form, may also be of an inner-rotor and outer-stator form, and preferably is a permanent magnet direct-drive motor of the inner-rotor and outer-stator form.

Preferably, a diameter of the driving belt pulley 33 mounted on the main shaft 3 is larger than a diameter of the belt pulley 113 on the generator rotating shaft 112, so as to achieve speed increase to a certain degree, thereby reducing a size and a weight of a generator.

FIG. 3 shows a situation that the generator module 11 is mounted at a top of the nacelle 8. However, mounting of the generator module 11 is not limited to the above situation, and the generator module 11 may be mounted outside or inside the nacelle 8. Moreover, the generator module 11 may be flexibly arranged in a front-rear direction and an up-down direction. For example, the generator module 11 may be arranged at positions ①, ②, ③ or ④ shown in FIG. 4. With the flexible arrangement of the generator module 11, a center of gravity of the hub and the blade can be balanced, such that a center of gravity of an entire wind turbine head is near a center line of the tower 6.

Figure 4:
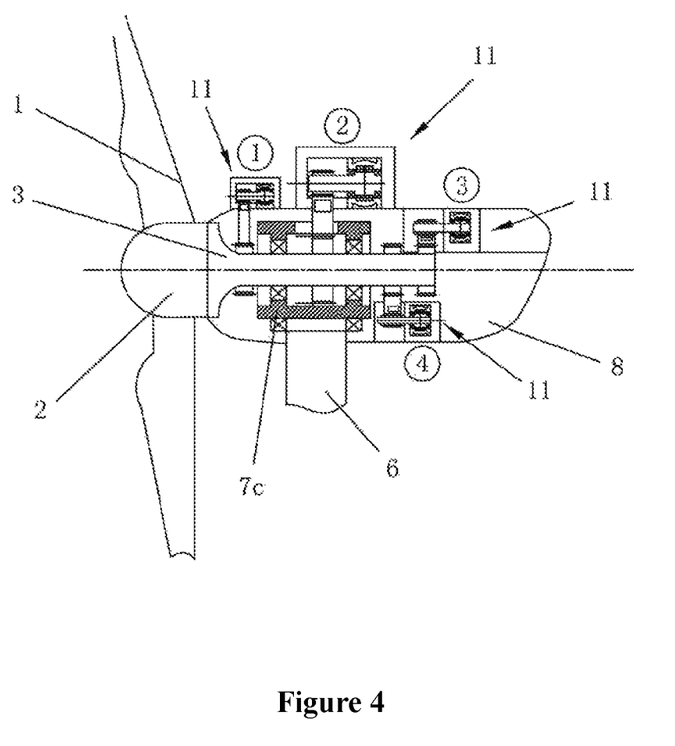
FIG. 4 is a schematic view showing an arrangement position of a generator module according to an embodiment of the present application.

Preferably, as shown in FIGS. 3 and 4, an opening is provided at an upper portion or a lower portion of the generator module housing 110, so as to allow the transmission belt 13 to pass through. Alternatively, the opening may not be provided, the generator rotating shaft 112 is allowed to extend to an outside of the generator module housing 110, and the belt pulley 113 may be provided at a portion of the generator rotating shaft 112 that extends to the outside. Correspondingly, in a case that the generator module 11 is mounted at the top of the nacelle 8, the top of the nacelle 8 is provided with an opening, so as to allow the transmission belt 13 to pass through.

Figure 5:
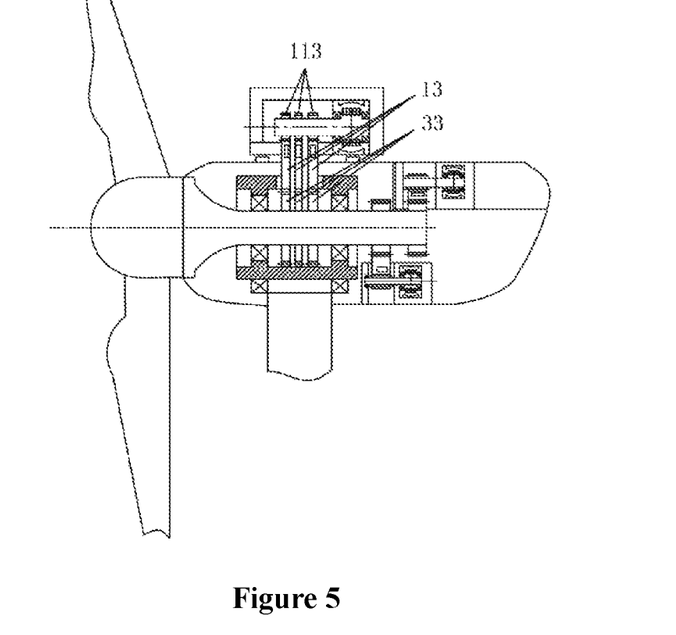
FIG. 5 is a schematic view showing a multi-toothed belt transmission structure of the wind turbine according to the embodiment of the present application.
Figure 6:
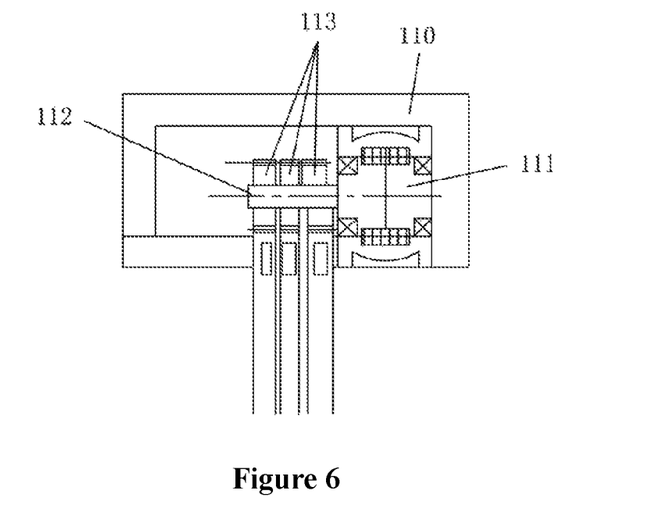
FIG. 6 is a schematic view showing an inside of the generator module according to the embodiment of the present application.

The transmission belt 13 is preferably a toothed belt. If the belt pulley is too wide, the transmission belt and the belt pulley may be subjected to uneven forces, which may affect an efficiency of the transmission belt. Therefore, in order to ensure that the transmission belt is subjected to uniform forces, and ensure a maximum efficiency of the transmission belt, the transmission belt according to the present application may be driven by multiple belt pulleys. As shown in FIGS. 5 and 6, in order to better ensure uniformity of force transmission, multiple belt pulleys 113 may be provided on the generator rotating shaft 112, and with the multiple belt pulleys, the uniformity of the force transmission can be better achieved. For the toothed belt, the number of toothed belts may be increased or decreased according to a safety factor, so as to achieve an optimal arrangement in structure. Herein, the multiple belt pulleys 113 may be in contact with one transmission belt 13 at the same time. Or, for the convenience of maintenance, each of the belt pulleys 113 may cooperate with one corresponding transmission belt 13, and in this case, transmission belts may have a same size. Of course, it may be designed that, the multiple belt pulleys 113 have different sizes, and the multiple transmission belts also have different sizes. Correspondingly, the main shaft 3 may also be provided with multiple driving belt pulleys 33, the multiple driving belt pulleys 33 may be in contact with one transmission belt 13 at the same time, or each of the multiple driving belt pulleys 33 may cooperate with one corresponding transmission belt 13.

The embodiment in which one generator module is mounted inside or outside the nacelle is described hereinabove. However, the situation is not limited to this, and multiple generator modules may be mounted. In this case, multiple driving belt pulleys 33 are provided on the main shaft 3, and correspondingly, multiple generator modules 11 are mounted inside or outside the nacelle 8. For example, as shown in FIG. 4, the generator modules 11 may be arranged at the position ①, ②, ③ or ④ at the same time. Moreover, as shown in FIG. 5, at least a part of the generator modules 11 may be provided with a structure of multiple belt pulleys.

Figure 7:
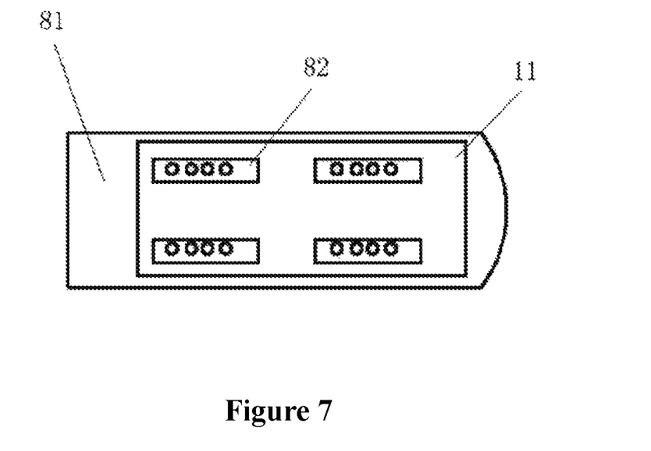
FIG. 7 is a top view of an assembly of the generator module according to the embodiment of the present application.

As shown in FIG. 7, the top of the nacelle 8 may be provided with a mounting block 82, and the mounting block 82 can increase a contact area between the top of the nacelle 8 and the generator module 11, and thereby improving the overall stability. The generator module 11 may be connected to the mounting block 82 by bolts. Preferably, the top of the nacelle 8 may be provided with a nacelle top mounting platform 81, and the mounting block 82 is arranged at the nacelle top mounting platform 81, so as to improve the convenience for installation.

As shown in FIG. 3, in order to increase a wrap angle of the belt pulley 113 and thereby to increase transmission of a transmission torque, an adjustable transmission belt tensioning mechanism 14 is provided, which is configured to apply a certain tensioning force to the transmission belt 13.

The transmission belt tensioning mechanism may be a hydraulic tensioning mechanism or a mechanical tensioning mechanism. The mechanical tensioning mechanism employs elastic pretension and has higher reliability, and the hydraulic tensioning mechanism has higher sensitivity and flexibility.

Figure 8:
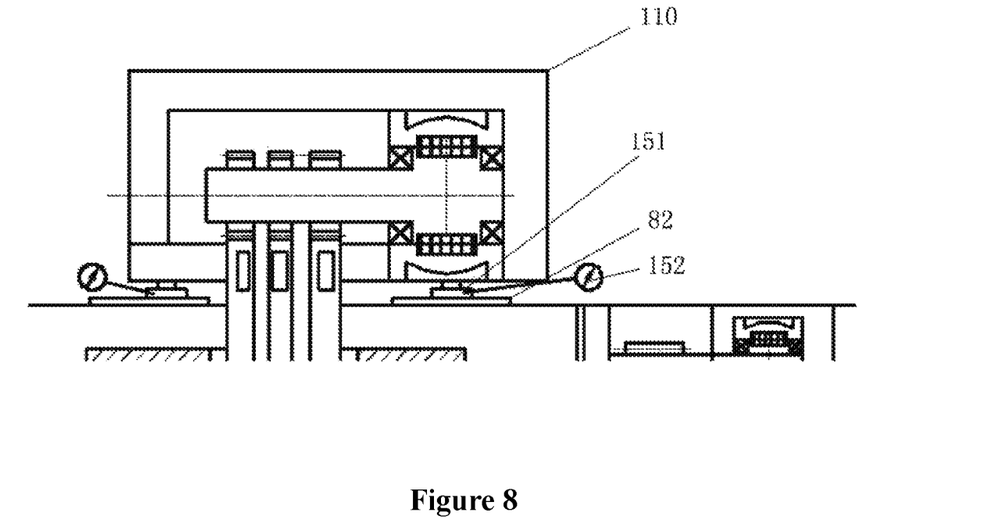
FIG. 8 is a schematic view showing a hydraulic tensioning mechanism.

In a case that the hydraulic tensioning mechanism is employed, as shown in FIG. 8, a hydraulic cylinder 151 may be provided between the top of the nacelle 8 and the generator module housing 110. During the pre-assembly of the transmission belt 13, the hydraulic cylinder 151 is at a low position under hydraulic control, and thereby the transmission belt 13 may be sleeved on the belt pulley 113. Then, oil is supplied to the hydraulic cylinder 151 under the hydraulic control, and the hydraulic cylinder 151 lifts the generator module 11, and thereby the transmission belt 13 is tensioned. The tensioning force of the transmission belt 13 can be read and converted from a hydraulic gauge 152, thus realizing real-time control of the tensioning force of the transmission belt 13, and thereby ensuring the smooth operation of the generator.

Figure 9:
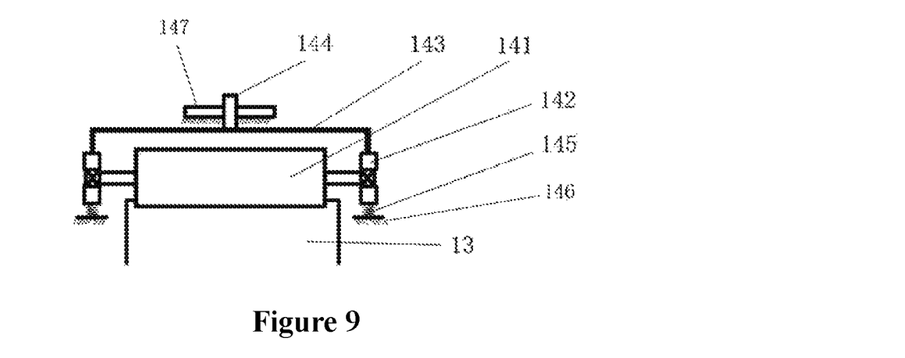
FIG. 9 is a schematic view showing a mechanical tensioning mechanism.
Figure 10:
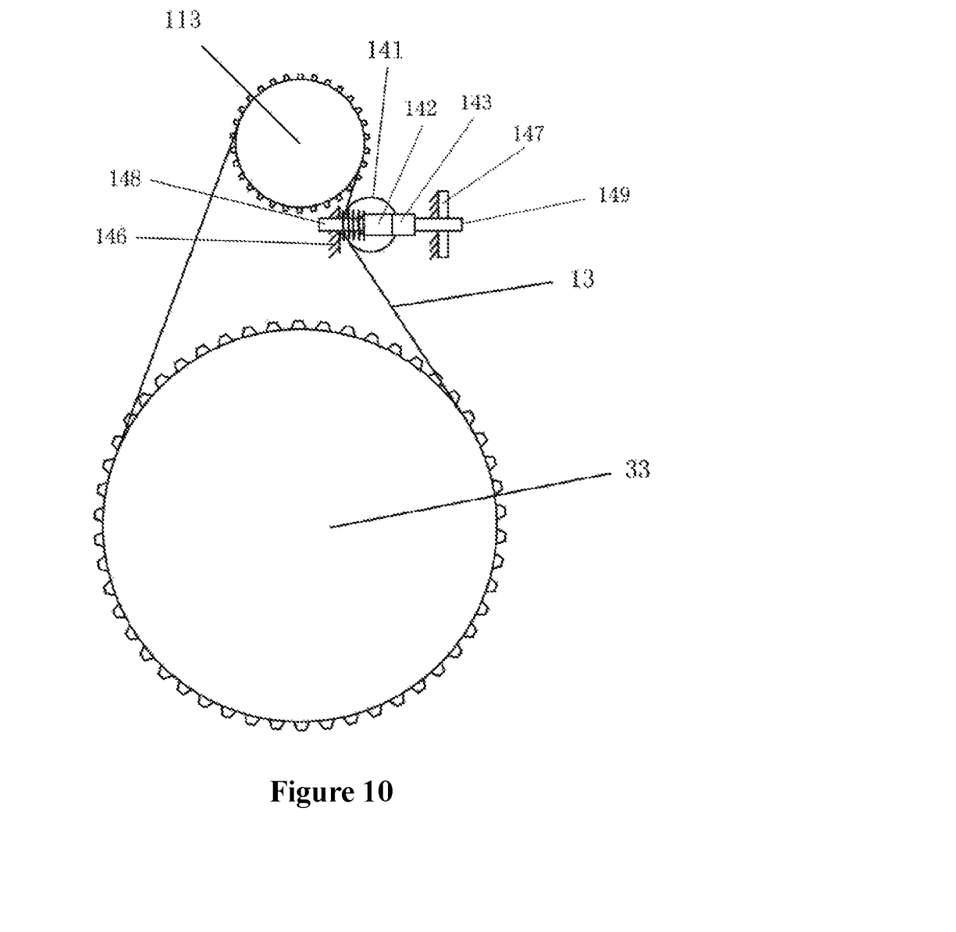
FIG. 10 is a schematic view showing a working state of the mechanical tensioning mechanism in FIG. 9.

In a case that the mechanical tensioning mechanism is employed, as shown in FIGS. 9 and 10, the mechanical tensioning mechanism may include a roller 141, bearing support seats 142, a bracket 143, a driving member, and elastic members 145. The roller 141 is in contact with the transmission belt 13, and each of two ends of a rotating shaft of the roller 141 is provided with a bearing support seat 142. A bearing is arranged in the bearing support seat 142, so as to rotatably support the rotating shaft of the roller 141. One end of each of the elastic members 145 is connected to a corresponding bearing support seat 142, and another end of the elastic member 145 is fixed to a corresponding first fixed bracket 146. The bracket 143 is connected to the two bearing support seats 142, and the driving member is in contact with the bracket 143, so as to drive the bracket 143 to reciprocate, so that the bearing support seat 142 can increase or decrease a pressing force to the transmission belt 13. The driving member may be an adjusting bolt 144, the adjusting bolt 144 may pass through a threaded hole of a second fixed bracket 147. By rotating the adjusting bolt 144, the bracket 143 and the bearing support seats 142 may be pressed, thus the roller 141 is allowed to press the transmission belt 13, and thereby the transmission belt is tensioned. The elastic member 145 may be, for example, a spring, but is not limited to this.

FIG. 10 shows a tensioned state of the transmission belt 13. Preferably, a first guiding rod 148 may extend from one end of the bearing support seat 142. The first guiding rod 148 passes through the first fixed bracket 146, and the elastic member 145 is sleeved on the first guiding rod 148 and located between the first fixed bracket 146 and the bearing support seat 142. Preferably, a second guiding rod 149 may extend from the bracket 143, and the second guiding rod 149 passes through the second fixed bracket 147. The first guiding rod 148 and the second guiding rod 149 function to support and guide the roller 141, however, a form of a supporting and guiding mechanism is not limited to this, as long as the roller 141 can be supported and moved smoothly.

Specific forms of the first fixed bracket 146 and the second fixed bracket 147 are not limited, as long as the first fixed bracket 146 and the second fixed bracket 147 are fixed with respect to the nacelle 8. The first fixed bracket 146 and the second fixed bracket 147 may be fixed to the nacelle 8 or the generator module housing 110. Moreover, the first fixed bracket 146 and the second fixed bracket 147 may be integrally formed.

In addition, the driving member is not limited to the adjusting bolt, and may be replaced with a rod-shaped member which is integrally formed with the bracket 143 or mounted on the bracket 143. In this case, the second fixed bracket 147 may be provided with a mechanism configured to allow the rod-shaped member to reciprocate by means of gear-rack or a hydraulic cylinder.

The generator module according to the present application has been described hereinabove by taking a situation that the generator module is applied to a wind turbine as an example, however, the generator module may also be applied to other fields in addition to the field of wind turbines.

The exemplary embodiments of the present application have been described in detail hereinabove. It should be understood by those skilled in the art that, various modifications and variations may be made according to the embodiments of the present application without departing from the spirit and scope of the application. However, it should be understood that, to those skilled in the art, such modifications and variations are also deemed to fall into the scope of the present application defined by the claims.

The invention claimed is:

1. A wind turbine, comprising:
a tower;
a nacelle arranged at a top of the tower;
a hub, on which a blade is mounted;
a main shaft, one end of the main shaft being connected to the hub, and another end of the main shaft extending to an inside of the nacelle; wherein
the wind turbine comprises a generator module,
wherein the generator module comprises: a generator module housing: a generator unit arranged in the generator module housing, wherein the generator unit comprises a rotor and a stator, the stator is fixed in the generator module housing, and the rotor is rotatable fitted with the stator; and a generator rotating shaft, wherein one end of the generator rotating shaft is connected to the rotor, the generator rotating shaft is provided with a belt pulley, and the belt pulley is configured to be connected to the main shaft by a transmission belt,
wherein the generator module is mounted at a top of the nacelle, and the top of the nacelle is Provided with an opening, to allow the transmission belt to pass through the opening and to be connected to the belt pulley,
the main shaft is provided with a driving belt pulley, and the driving belt pulley is directly connected to the belt pulley via the transmission belt, to drive the generator rotating shaft to rotate.

2. The wind turbine according to claim 1, wherein a plurality of generator modules are mounted inside or outside the nacelle, and correspondingly, a plurality of driving belt pulleys are provided at the main shaft.

3. The wind turbine according to claim 1, wherein the main shaft and the generator rotating shaft are arranged in parallel in an up-and-down direction.

4. The wind turbine according to claim 1, wherein the generator module is mounted at a top of the nacelle, and an upper surface of the nacelle is provided with a mounting block configured for mounting the generator module.

5. The wind turbine according to claim 1, wherein the generator rotating shaft is provided with a plurality of belt pulleys spaced apart from one another in an axial direction.

6. The wind turbine according to claim 5, wherein the plurality of belt pulleys are in contact with one transmission belt, or each of the belt pulleys is in contact with one corresponding transmission belt, respectively.

7. The wind turbine according to claim 1, wherein the main shaft is provided with a plurality of driving belt pulleys, and the plurality of driving belt pulleys are in contact with one transmission belt, or each of the driving belt pulleys is in contact with one corresponding transmission belt, respectively.

8. The wind turbine according to claim 1, wherein the transmission belt is a toothed belt.

9. The wind turbine according to claim 1, wherein a diameter of the driving belt pulley is greater than a diameter of the belt pulley.

10. The wind turbine according to claim 1, further comprising a transmission belt tensioning mechanism.

11. The wind turbine according to claim 10, wherein the transmission belt tensioning mechanism is a mechanical tensioning mechanism, and the mechanical tensioning mechanism comprises:
a roller in contact with the transmission belt;
two bearing support seats configured to support a rotating shaft of the roller at two sides of the roller respectively;
a bracket configured to connect the two bearing support seats;
a driving member configured to apply a force to the bracket, to allow the two bearing support seats to move in a direction for pressing the transmission belt or in an opposite direction; and
elastic members configured to apply elastic forces to the two bearing support seats in a direction opposite to the moving direction of the two bearing support seats.

12. The wind turbine according to claim 10, wherein the transmission belt tensioning mechanism is a hydraulic tensioning mechanism, and the hydraulic tensioning mechanism comprises a hydraulic cylinder configured to move the generator module in a height direction of the nacelle.

* * * * *